United States Patent [19]
Peled et al.

[11] Patent Number: 5,283,136
[45] Date of Patent: Feb. 1, 1994

[54] RECHARGABLE BATTERIES

[75] Inventors: Emanuel Peled, Even Yehuda; Aryeh Lin, Ramat Gan, both of Israel

[73] Assignee: Ramot University Authority for Applied Research and Industrial Development Ltd., Tel Aviv, Israel

[21] Appl. No.: 893,026

[22] Filed: Jun. 3, 1992

[51] Int. Cl.[5] .................. H01M 4/38; H01M 6/16
[52] U.S. Cl. .................. 429/192; 429/196; 429/218; 420/400; 420/407
[58] Field of Search .......... 429/218, 194, 196, 192; 420/400, 402, 528, 407, 415, 533

[56] References Cited

U.S. PATENT DOCUMENTS

| | | | |
|---|---|---|---|
| 4,975,345 | 12/1990 | Coetzer | 429/218 X |
| 5,013,620 | 5/1991 | Miyazaki et al. | 429/218 X |
| 5,039,582 | 8/1991 | Pistoia | 429/218 |
| 5,045,416 | 9/1991 | Plichta et al. | 429/218 X |

Primary Examiner—Anthony Skapars
Attorney, Agent, or Firm—Jacobson, Price, Holman & Stern

[57] ABSTRACT

There are provided novel anodes for lithium alloy electrochemical cells, and cells based on such anodes. The alloys used comprise one or more active metals which leaves or leave the anode matrix during discharge of the cell, with the alloy remaining in an intermediate variostoichiometric range during both charge and discharge of the cell. The curve of open circuit voltage as well as working condition voltage versus lithium content of the anode slopes, with no appreciable plateau. A specific embodiment relates to such anodes with a solid polymer electrolyte containing a suitable polymer. Another embodiment refers to porous electrodes made by sintering an alloy powder with a binder.

10 Claims, 7 Drawing Sheets

RECHARGABLE BATTERIES

FIELD OF THE INVENTION

The invention relates to novel anodes for electrochemical cells, and especially for rechargeable cells. They are especially suited for rechargeable lithium anode cells, but the invention also encompasses other electrodes and cells containing same, which have the unique charging and discharging characteristics as regards sloping curve of open circuit voltage versus content of the active metal during charge and discharge.

The anodes of the invention are essentially alloys comprising an active metal or metals, which leaves or leave during discharge the anode matrix, with the alloy remaining essentially in an intermediate phase-like range (or in the variostoichiometric range) during charge and discharge of a cell with such anode.

BACKGROUND OF THE INVENTION

The invention relates to anodes for use in lightweight rechargeable electrochemical cells, and to such cells. The invention is illustrated in the following with reference to lithium and lithium-alloy anode cells. It ought to be understood that the invention also relates to other anodes and electrochemical cells, wherein the system exhibits essentially the same unique characteristics as that of lithium anodes of the invention.

Lithium metal has one of the lowest equivalent weights and its inclusion and recycling to an extent of 5 to 20 percent of electrode weight gives one of the lowest weights possible for negative, secondary cell electrodes. As such it is important for energy storage in such uses which require low weight per energy unit.

Pure lithium cannot be deposited from non-aqueous solution without the formation of a protecting film on the electrode. This film is known as Solid Electrolyte Interphase, and this inhibits the passage of electrons from the metal electrode to the electrolyte solution. Thermodynamically the reduction reactions of the electrolyte are preferable to the deposition of pure lithium. On the other hand, deposition of lithium in the form of an intermetallic compound or intermediate phase-like metallic solution may be preferable to some of these reduction reactions. If the lithium deposition is not quick enough, large overpotentials may be needed, making a quicker electrolyte reduction reaction kinetically preferable.

Reduction of electrolyte solution during deposition of free lithium results also in shortening of battery life, because some of the reduction products are insoluble in the solution and thus precipitate on the surface of the lithium anode.

In the case of pure lithium deposition, the isolation of active lithium masses from each other and from the current collector, is a common disadvantage.

Another failure mechanism of rechargeable lithium batteries is shorts formation by lithium dendrites leading sometimes to the explosion of such batteries.

In the prior art, lithium alloy electrodes, based either on single or mixed matrix models were used. Two major drawbacks have been encountered:
1) The rechargeability of Lithium s limited to only 3-6% Wt of the active mass (ref 1).
2) crumbling of the anode into powder during use. Furthermore iron or nickel were added (ref.2) in high proportions to give better performance, reducing even more the weight percentage of the lithium. Several Examples from the literature for compositions that have been tried, are:

(w/w%-approximate):

| | |
|---|---|
| Li7Al93 (crumbles) | Li (7%) Al (93%) |
| Li7Sn93 (crumbles) | Li (7%) Sn (93%) |
| Li3.5Pb67.5Cd29 (low in Li) | Li (3.5%) Pb (67.5%) Cd (29%). |

SUMMARY OF THE INVENTION

The invention relates to anodes for use in rechargeable electrochemical cells and to cells containing such anodes. The anodes of the present invention have certain unique characteristics, as is set out in the following.

Amongst these there ought to be mentioned that the anode is an alloy of certain elements and of lithium (or other metal or metals), which enters and leaves at least in part the anode matrix during charge and discharge of the cell. The curve of open cell voltage versus content of such metal (lithium or the like) during charge or discharge slopes, and does not comprise any appreciable plateau. Furthermore, the said anode alloy remains during charge and discharge essentially fully in an intermediate phase range.

The novel lithium cells comprising such anodes can be used from about $-40°$ C. and up to about $200°$ C. The anode alloy, in the case of lithium anodes, comprises in combination aluminum and magnesium and lithium, optionally and in certain cases advantageously with one or more further elements.

Generally such anodes car) contain up to about 30 weight-% of lithium, the practical range generally being in the range of from about 5 to 15% (all percentages, unless otherwise indicated, are weight-%). Aluminum comprises generally at least 20%, and may be up to a maximum of about 75%; magnesium at least about 5%, and up to about 60%. The weight ratio of magnesium to aluminum will be generally in the 0.25 to 1 and up to about 1.5:1 range, and the practical minimum content of aluminum will be about 35%, and of magnesium, about 15%. It is one of the pronounced advantages of cells of the invention that the anode provides up to about twice the charge on a weight basis as compared with other lithium alloy cells, as lithium can be charged and discharged up Lo about 12% of the anode, and practically generally in the 10% range.

The novel anodes provide a higher energy per unit charge because the lithium is discharged with more free energy than is the case with lead or cadmium anodes. The novel anodes can be charged and discharged repeatedly without appreciable deterioration. Cells with such novel anodes are safer than conventional ones with lithium anodes. Generally the solid solutions (intermediate phases) of the present invention anodes have continuous electrochemical potentials versus $Li/Li^+$ of from about 0.05 V to about 0.8 V. The anodes of the invention may comprise in addition to lithium, aluminum and magnesium, one or more of the following: Cd, Zn, Sn, Pb, Bi, In, Ga, Hg, Sb), which will comprise not more than about 40% of total anode weight, and preferably up to about 25% of anode weight, and where each of the elements does not comprise more than about 5%; the anode may further comprise one or more of the following:

As, P, Si, Ge, C, Fe. Ni, Cu, Cr, V, Co, Zn, Mo, Nb, Mn.

the total weight of all these not exceeding about 20%, and preferably not more than About 10%, with each of them not comprising more than about 3 per cent of anode weight. The cells can be practically of any desired size. There may be provided multi-plate cells with a number of such anodes.

It is yet another object to provide an anode composition capable of operation in solid state (secondary) cells, polymer electrolyte cells, and liquid electrolyte solutions cells.

It is a further object of the invention to provide such cells with an electrolyte composition which may include lithium iodide and PC, possibly with EC, Mono-, Di, Tri, Tetra- Glyme and possibly with minor addition of magnesium and/or calcium and/or barium and/or strontium salts, whose anions are compatible with the anode and the cathode and which is safer for use and free from toxicity, hazards, and from irritating vapors.

The invention also provides a method of preparing an improved anode which comprises: forming an alloy by melting all the ingredients and mixing well, quenching, grinding and sintering or compacting, in the presence of binders, inert expanders etc., all said operations being done in an inert gas atmosphere (e.g., Argon). Additional objects, advantages and novel features of the invention will be set forth in the description which follows and in part will become apparent to those skilled in the art upon examination of the following description.

DETAILED DESCRIPTION OF THE INVENTION

The present invention relates to a rechargeable battery which comprises of an anode, an electrolyte and a cathode. More specifically the subject invention relates to electrochemical cells which utilize one or more electrodes of the all-solid metal solid solution or a close succession of Lithium intermediate phase type preferably of high surface-to-volume ratio (high specific area).

The electrolyte typically may be a lithium salt solution in organic aprotic solvents or Li salt-containing polymer electrolyte, or a solid electrolyte, all of which should be compatible with both the anode and the cathode.

The cathode may comprise oxides, chalcogenides or halogenides of Ag, Cu, Co, Ni, Mn, Ti (etc), like $CoF_3$, $NiF_2$, $CuCl_2$, $AgCl$, $AgI$, $CoS_2$, $TiS_2$, $Li_xMnO_2$ $Li_xCoO_2$, etc. (ref. 3), blended with a conductive material and binder, if necessary and of good compatibility with the electrolyte being chosen.

The characteristics of the anode phases, whether charged (with the electroactive species) or discharged, includes acceptable diffusion and concentration for the electroactive species, stability over the operational range of electrode potential, by way of restoring after each charge-discharge cycle, the previous structure, that is of good reversibility of both structural and physical properties.

Said electrode, both in charged and discharged states has sufficient electronic conductivity, thus enhancing electroactive species diffusion in and out of the electrode.

The anode of the subject invention can be made from different combinations of ingredients. Preferably the electroactive species will be originally included in the composite and not added electrochemically in order to include and re-include the high amount of active species desired by way of built-in sites so that the whole system is flexible enough as to desorb and absorb the electroactive species without excessive degradation both of structural and physical properties, taking place.

Figure 1:
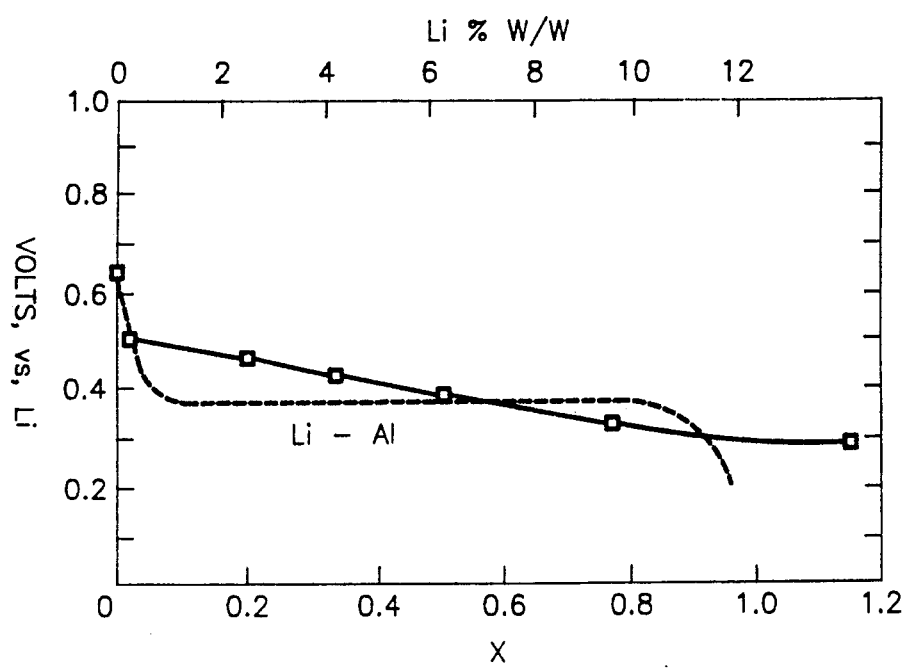
FIG. 1—A coulometric titration curve of $Li_xMgAl$ electrode superimposed with same curve for LI-Al) (not part of this invention) showing the effect of Mg addition in 1M/LiI/1M/Diglyme/PC electrolyte, t - 25° C.
Figure 4:
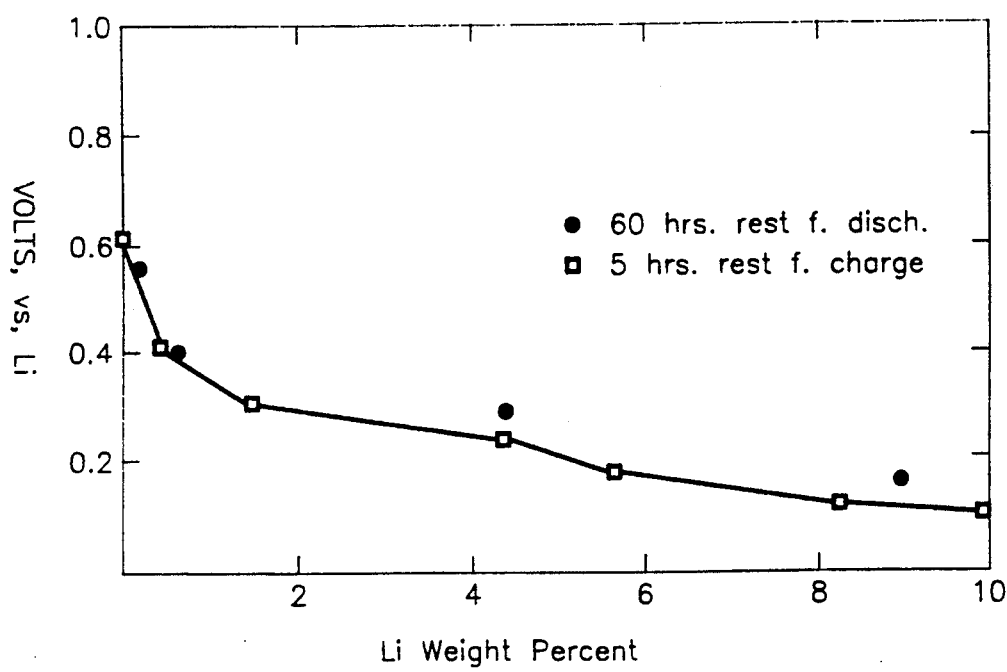
FIG. 4—A coulometric titration curve of $Li_xMg_{0.67}Al_{0.96}Ga_{0.02}Sn_{0.02}$ powder-cold-rolled on Cu gauze, in 1M LiI/PC. The charge density is 8 mAH/sq.cm. t = 25° C.

It is essential that the components have a variostoichiometric range with the electroactive species, also called homogeneity ranges, or intermediate phases preferably of high diffusion coefficients, and adjacent potentials to each other making them mutually miscible and having a potential continuum acceptable for practical use. Combination of the said ingredients gives a high concentration of rechargeable lithium and good diffusion coefficients for the combined phase. A typical potential vs. Lithium composition curve is shown in FIGS. 1 and 4 where the potential slopes monotonously with composition, i.e. with no voltage plateau.

For example, the following Table includes such a series of Li intermediate phases (denoted by Me+xLi, where Me stands for Metal(s)). The information is from our work* as well as literature data.

| No. | Composition | x: | Potential range vs. Li, V |
|---|---|---|---|
| 1. | Sn + xLi | 0.05 to 0.7 | 0.8 to 0.53 |
| 2. | Mg Al + xLi | 0.05 to 1.00 | 0.6 to 0.3* example No. 1 |
| 3. | $Mg_{0.67}Al_{0.96}Sn_{0.02}Ga_{0.02}$ +xLi: | 0.05 to 0.77 | 0.6 to 0.1* example No. 4 |
| 4. | Ga + xLi | 0.8 to 1.3 | 0.54 to 0.12 |
| 5. | Al + xLi | 1.5 to 1.6 | 0.06 to 0.02 |

All compositions may be prepared either separately, ground or otherwise size-diminuted and then mixed together and worked mechanically or, preferably, the ingredients like Li, Mg, Al, Ga, Sn, etc. be melted together in the required proportions, to get the highest weight percentage of Li which does not significantly depart from the solubility range (i.e. the alloy consists essentially of one phase, possibly partially amorphous or a close succession of many intermediate phases of adjacent potentials.

Generally the Li richest phase on weight basis which is $Li_{(x)}Mg_{0.67}Al$ is taken as computing basis and Ga, Sri etc. replace Al on an atomic basis. In practice, enrichment of any component should not cause formation of additional phases in significant quantity as a result of passing the solubility limit.

The required solid solution character can be easily verified by Powder X-Ray Diffraction and coulometric titration. The appearance of a phase having too low a potential like composition 5 in the above Table can be eliminated by replacing some of the Al by Sn, Cd, Bi, Zn, Pb, Sb, etc. which, being also relatively soft metals, enhance fusibility for the alloy.

When the right combination of materials has been chosen, it exhibits a superior mechanical stability over intermetallic compounds and it has sufficient lithium diffusivity, electronic conductivities and stability in every state of charge.

For high power applications, it is preferred to use a high surface area anode (porous electrode) made by sintering of alloy powder, or using a binder to hold together the alloy particles.

The following embodiment was chosen to illustrate the principles and the practical applications of the invention, to enable those skilled in the art to utilize the invention also in various other embodiments and various modifications as are suitable for the particular use contemplated. The aftergoing description of the preferred embodiment of the invention, therefore, has been presented only for the purpose of illustration of the invention.

Figure 8:
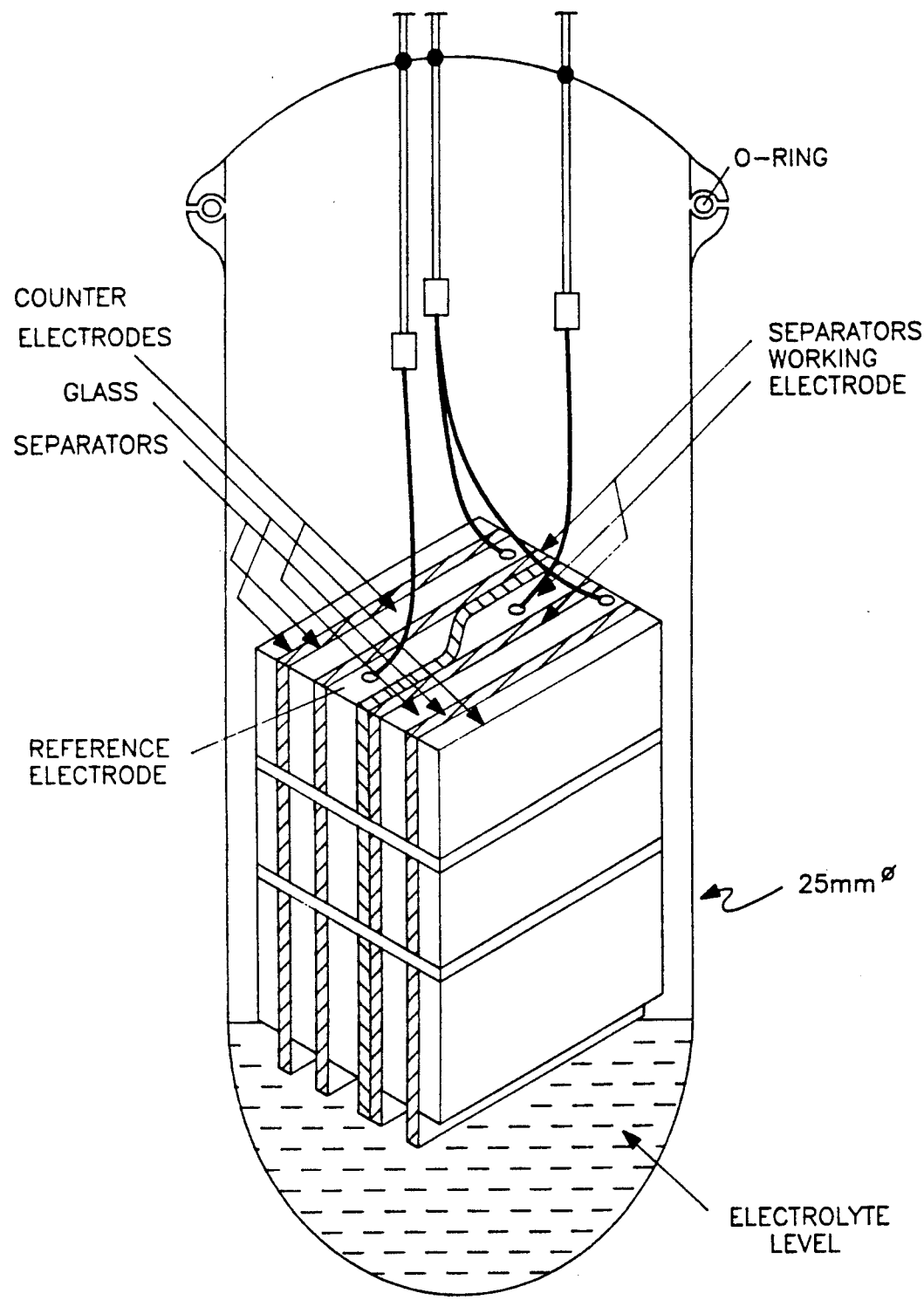
FIG. 8—A schematic illustration of the electrochemical cell that was used as a test vehicle.
Figure 9:
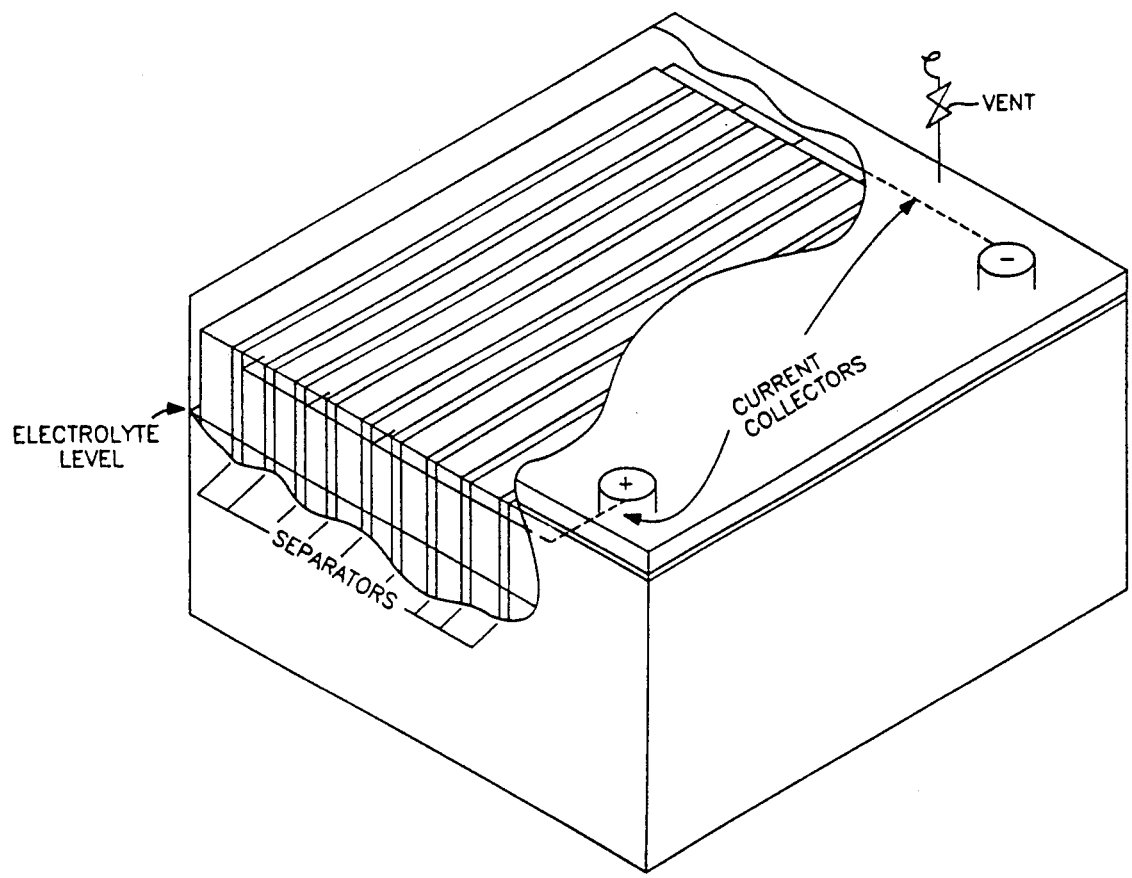
FIG. 9—A schematic illustration of a prototype cell using an electrode composition of the present invention.

An electrochemical cell was assembled with a reference electrode of lithium or known lithium alloy adjacent to it and two auxiliary electrodes parallel to it, on both sides. All the said electrodes are separated by porous "Tefzel" separators and compacted together by stainless steel or glass plates, tightened by stainless steel screws or PTFE strips (resp.), the current collector being of Ni, stainless steel or copper gauzes of 0.005" (or less) diameter wire. The active mass was pressed or powder=pressed or powder coldrolled or powder hot rolled upon the current collectors. The assembly was tested under starved conditions while the end of the separators was rinsed in the salt electrolyte solutions (FIG. 8). The cell was hermetically closed in a pyrex vessel which was placed in a glove box filled with argon. A scaling-up of said cell (prototype) is shown in FIG. 9.

EXAMPLE 1

Lithium metal, magnesium metal and aluminum metal 0.8, 2.4, 2.7 g (resp) giving the approximate composition $Li_{1.15}MgAl$ were melted in a stainless steel 316 vessel inside an Ar glove box equipped with $H_2O$, $O_2$ and $N_2$ purifiers, mixed well after melting and quenched on a stainless steel plate in an Argon atmosphere. Later the cold mass was ground and 34 mg. pressed at 6000 atm. onto a Ni Gauze to 0.18 mm thickness area 2 $cm^2$. The electrode formed was assembled against lithium auxiliary and reference electrodes (see FIG. 8). SEM examination showed Fe, Cr to be less than 0.05% Wt. The electrolyte was 1M LiI+1M Diglyme in PC solution. The Stoichiometric curve is shown in FIG. 1. This cell was charged and discharged for 32 times.

EXAMPLE 2

Figure 2:
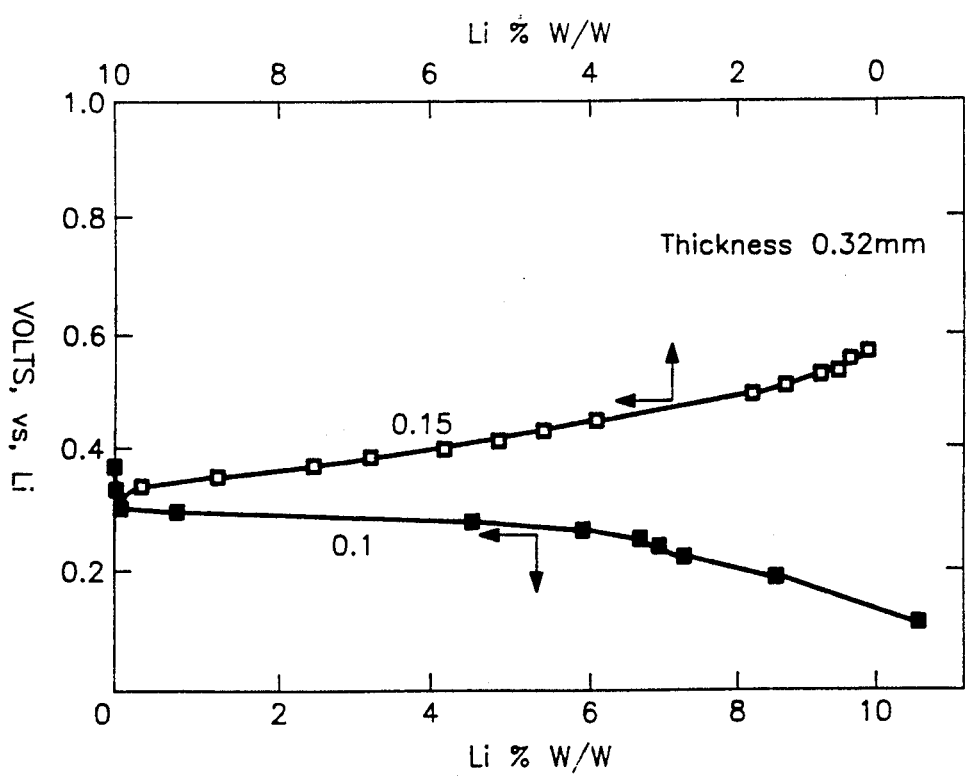
FIG. 2—Charge and discharge curves of $Li_xMgAl$ electrode pressed at 6000 atm on Ni Gauze, against Li reference electrode, in 1M LiI/1M diglyme/PC electrolyte, t - 25° C. The electrode thickness: 0.32 mm area: 1 cm$^2$ planar current density 0.1 to 0.15 mA/sq.cm.

Lithium, magnesium and aluminum metals, 0.56, 2.4, 2.7 g. (resp.) giving the approximate composition $Li_{0.08}MgAl$ were mixed together and melted as before, quenched, 18 mg pressed and assembled as before (thickness: 0.32 mm Area: 1 $cm^2$). The charge and discharge curves are shown in FIG. 2. The cell was cycled three times with no loss in capacity.

EXAMPLE 3

Figure 3:
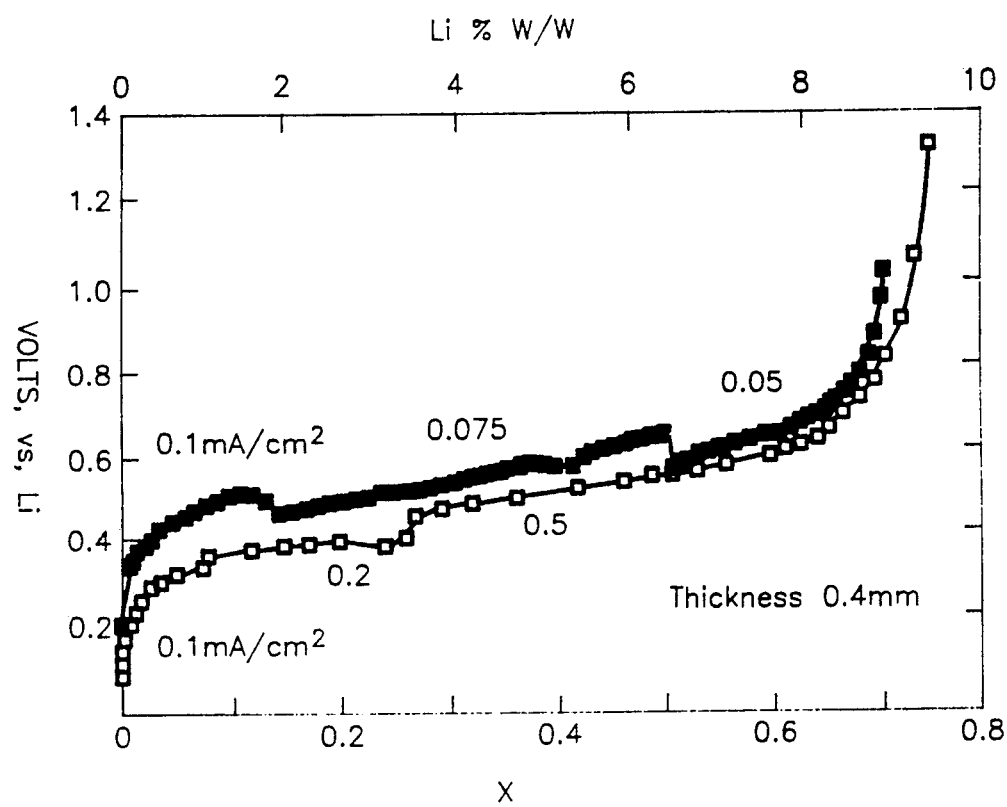
FIG. 3—Discharge curves of $Li_{0.8}MgAl_{0.95}Ga_{0.05}$ and $Li_{0.8}MgAl$ electrodes (pressed at 6000 atm each) plotted against Li reference electrode, showing the benefit of Ga addition. The thickness is 0.4 mm, area 2 cm$^2$ in both electrodes. The current densities are up to 0.5 and 0.1 mA/sq.cm respectively and the charge density 15 mAH/sq.cm. t - 25° C. electrolyte: 1MLiI/PC.

The same composition (of prior example) was (34 mg) pressed to 0.4 mm thickness; area: 2 $cm^2$, two-sided. Another composition including Lithium metal, Magnesium metal, Aluminum metal and Galium metal (0.56, 2.4, 2.56, 0.35 g.resp.) giving the approximate composition $Li_{0.8}MgAl_{0.95}Ga_{0.05}$ (91 mg) was also pressed to a 0.4 mm thickness area: 2 $cm^2$, one-sided. Both were assembled as before. Discharge curves of both are shown in FIG. 3 showing the effect of Galium addition. The alloy containing 0.05 Ga discharged at higher rate at lower over-potentials.

EXAMPLE 3a

The same composition (of prior example) but with Si 0.01 instead of Ga 0.05. Similarly pressed and assembled, could also be discharged at higher rate e.g., 0.3 mA/sq.cm.

EXAMPLE 4

Figure 5:
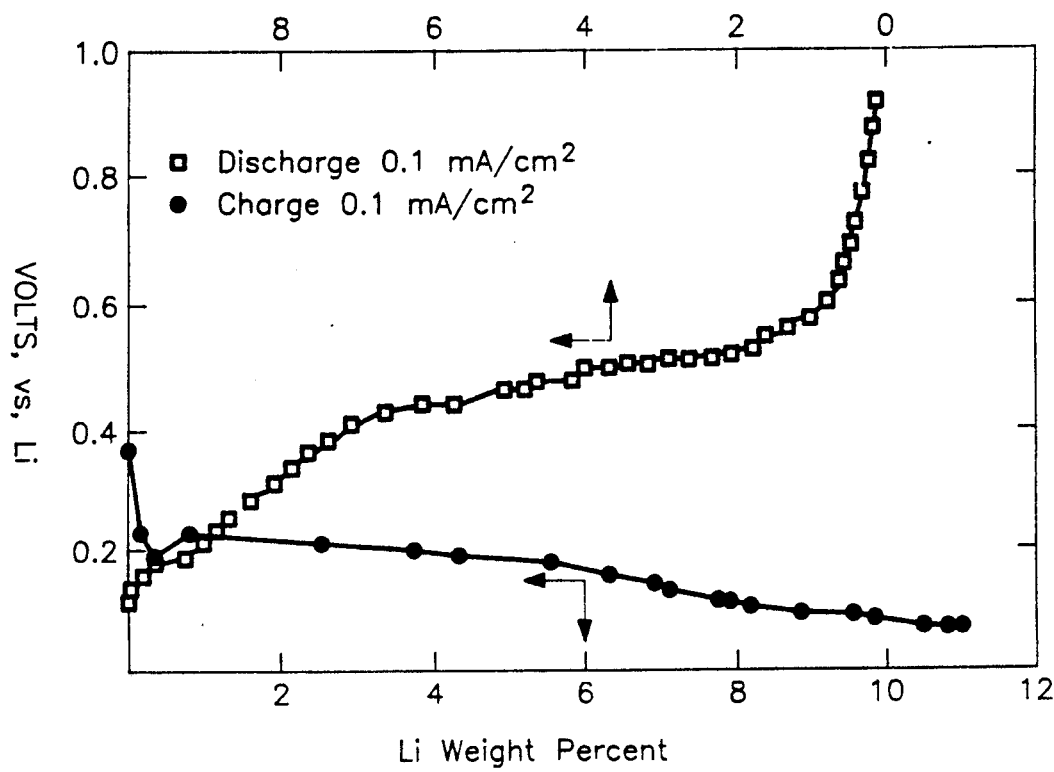
FIG. 5—Charge and discharge curves of $Li_xMg_{0.67}Al_{0.96}Ga_{0.02}Sn_{0.02}$ electrode plotted versus Li reference electrode, in 1MLiI/PC (cycle No. 3). The thickness is 0.25 mm area 5 cm$^2$ and the current density 0.1 mA/sq.cm. t = 25° C.
Figure 5A:
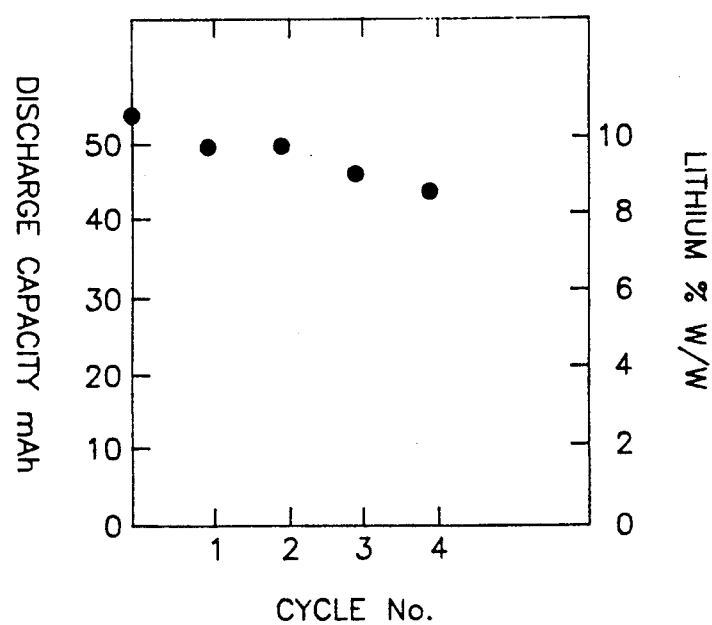
FIG. 5a—A plot of cell capacity (limited by the anode) vs. cycle number. Anode composition of FIG. 4.

Lithium metal, Magnesium metal, Aluminum metal, Galium metal and Tin metal 0.55, 1.6, 2.6, 0.15, 0.2 g. (resp.) giving the approximate composition $Li_{0.77}Mg_{0.067}AP_{0.96}Ga_{0.02}Sn_{0.02}$ were melted in a stainless steel crucible in an Ar filled glove box equipped with $H_2O$ purifiers, mixed well and Ar-quenched on stainless steel plate. Later the cold mass was ground and 132 mg. powder cold-rolled on copper 0.005" diam. wire gauze (thickness: 0.25 mm, area: 5 $cm^2$). The electrode thus formed was assembled in the said embodiment with PC electrolyte containing 1M LiI. Stoichiometry curves are shown in FIG. 4. Charge and discharge curves are shown in FIG. 5. The cell was cycled (charged and discharged) and the discharge capacities for the first 5 cycles are shown in FIG. 5a.

EXAMPLE 5

Figure 6:
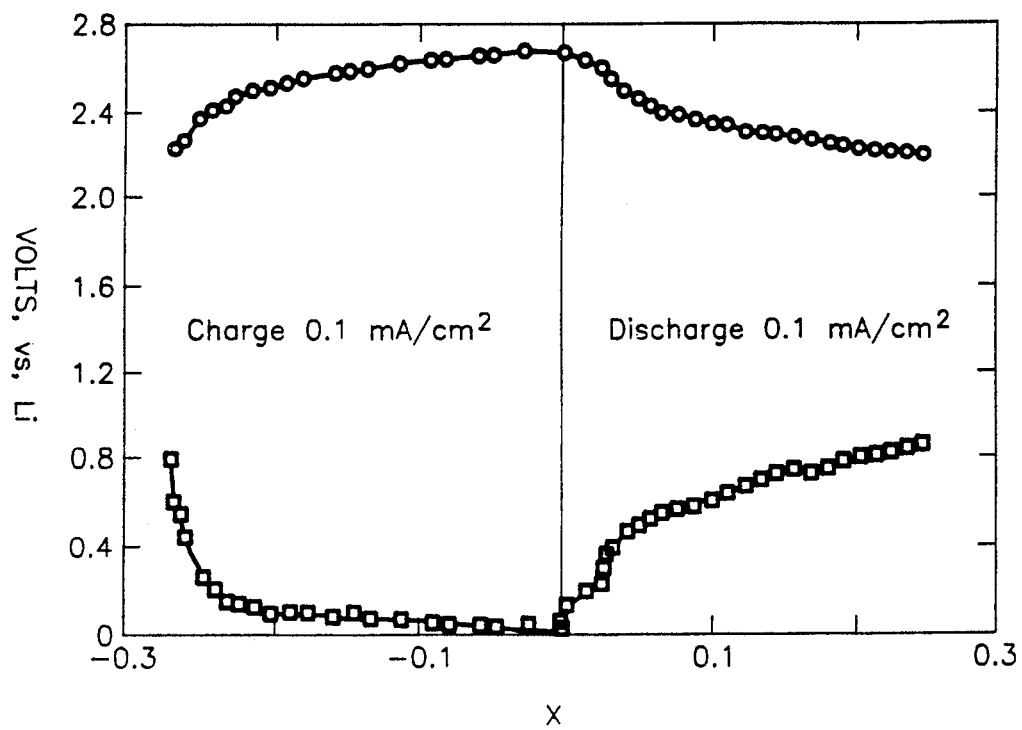
FIG. 6—Charge and discharge curves of $Li_xMgAl_{0.95}Ga_{0.05}/CoS_2$ battery, having 1MLiI/PC electrolyte (cycle No. 6) potentials shown are vs. Li reference electrode: t = 25° C. planar current density 0.1 mA/sq.cm.

30 mg. electrode of composition identical to Example 2 was assembled in the said embodiment but with $CoS_2$ cathode (including Cu, graphite conductor and PTFE binder), instead of Li counter electrode. The discharge and charge behaviour for cycle No. 6 is given in FIG. 6 (reference to Li).

EXAMPLE 5a

Figure 6A:
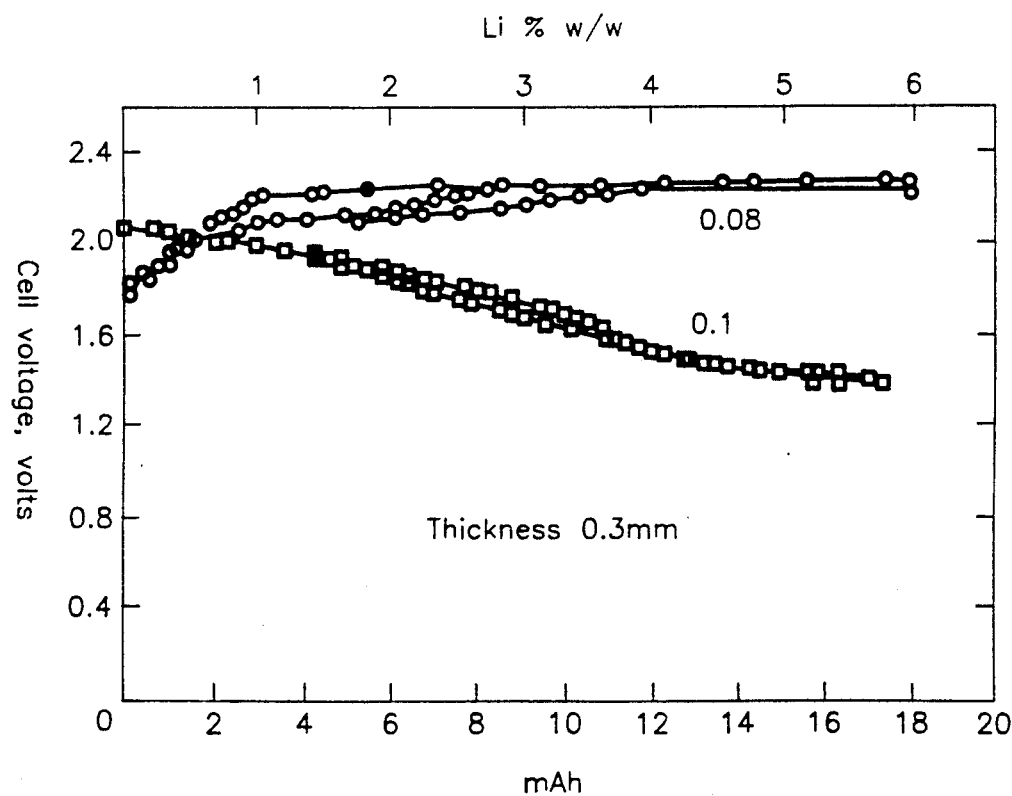
FIG. 6a—Charge and discharge curves of $Li_xMg_{0.67}Al_{0.96}Sn_{0.92}Ga_{0.02}$ Lithiated $CoO_2$ battery, having 1M $LiCPO_4$/PC electrolyte cycles 1,2,3. Absolute voltages are shown anode area 3.cm$^2$, thickness 0,3 mm. t = 25° C. current density 0.1 to 0.15 mA/sq.cm.

A 95 mg. electrode of composition identical to Example 4 was assembled in a steel cup with partly lithiated $CoO_2$ cathode, $LiCPO_4$/PC electrolyte. The discharge and charge behaviour for cycles 1,2,3 is given in FIG. 6a.

EXAMPLE 6

Figure 7:
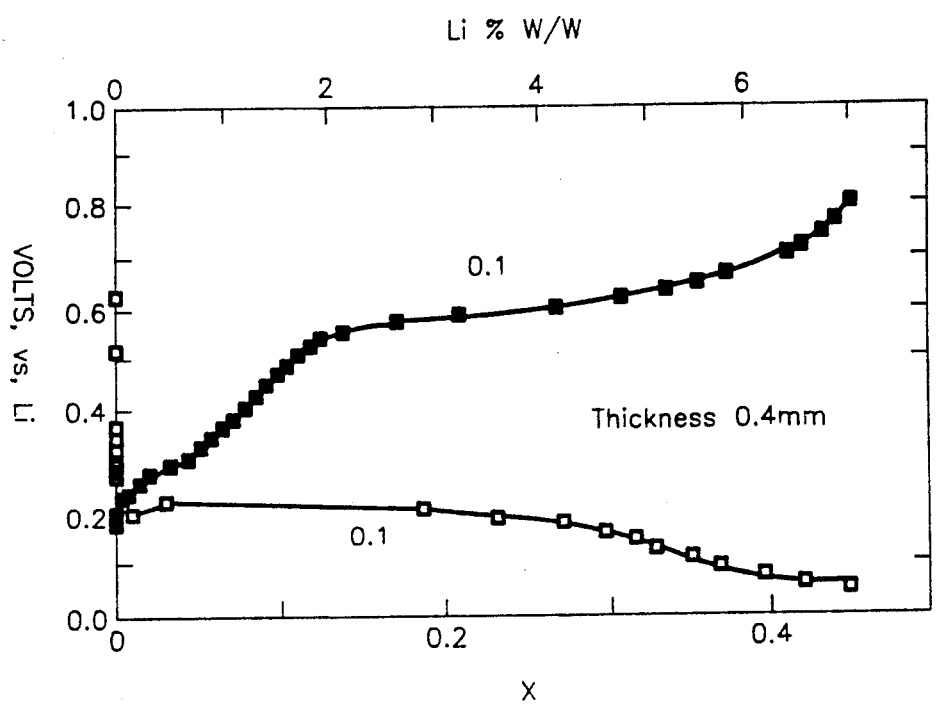
FIG. 7—Charge and discharge curves of $Li_{0.5}MgAl_{0.99}Ga_{0.01}$ powder-cold-rolled on st.st.gauze, in the presence of $Mg^{++}$Salt, against Li, in 1MLiI/PC electrolyte (cycle No. 2). t = 25° C. Current densities 0.1 to 0.15 mA/sq.cm planar electrode thickness 0.4 mm, area 1,6 cm$^2$.
Figure 7A:
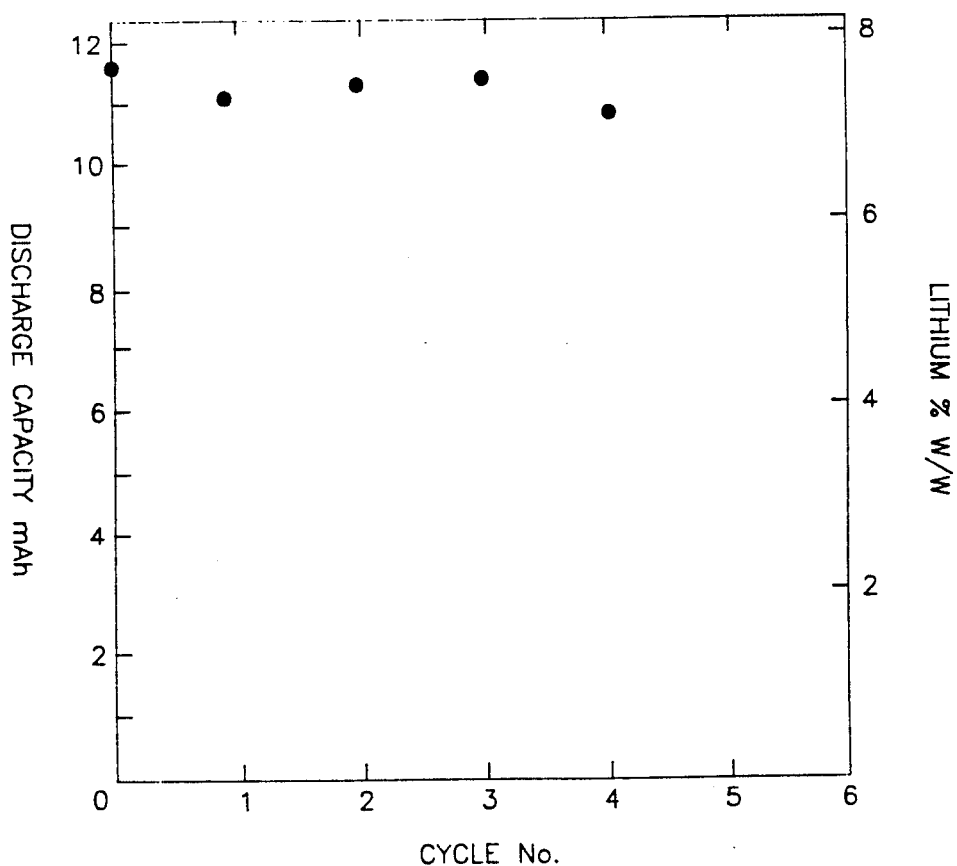
FIG. 7a—A plot of capacity vs. cycle number for cell described in FIG. 7.

Lithium metal, Magnesium metal, Aluminum metal and Galium metal 0.35, 1.6, 2.67, 0.075 g (rest)) giving the approximate composition $Li_{0.5}Mg_{0.67}, AL_{0.99}Ga_{0.01}$ were melted, quenched, ground and 40 mg powder-cold-rolled on stainless steel gauze (thickness: 0.41 mm, Area: 1.6 $cm^2$). The 1M LiI/PC electrolyte contained $MgCl_2$ 0.4% mol/mol proportion to LiI. Charge and discharge curves (cycle No. 2) are shown in FIG. 7. Discharge capacities for first 5 cycles are shown in FIG. 5a.

EXAMPLE 7

About 1 g of composition identical to example 4 was melted and mixed well with totally dehydrated lithium salt of very fine particles that did not melt but dispersed homogeneically in the melt. The melt was quenched in an argon atmosphere and then put in dioxolane 1,3 solvent for a week when it became a porous mass which could be discharged at over 1 mA/$cm^2$ when pressed gently over a suitable frame.

EXAMPLE 8

About 1 g. of composition identical to example 6 was melted, mixed well, quenched, finely ground in AR atmosphere with 50 mg Carbon. Pressed over a suitable frame, it can be discharged at over 1 mA/$cm^2$,

REFERENCES

1. Toyuguchi Y et al. in Progress in Batteries & Solar Cells, vol. 6, 1987, pp. 58-60.
2. J.P. 60.124,357 Jul. 3, 1985.
3. Jasinski R in Electrochemical Power Sources, 6, (1968) 28-35.
4. Problems of Nonstoichiometry by Rabenau A. North Holland (Amsterdam), 1970, p. 4.

We claim:

1. An anode for use in electrochemical cells, which is an alloy of 2 to 30% lithium and other elements, containing at least 20% aluminum and at least 5% magnesium, the composition of the alloy being such that during charge and discharge of the cell, the curve of open circuit voltage as well as the voltage under working conditions versus lithium content of the anode is of a gradually sloping nature, said alloy remaining during charge and discharge in an intermediate phase range or in the variostoichimetric range, said anode containing from zero to 5% of elements selected from the group consisting of:

Cd, Zn, Sn, Pb, Si, In, Ga, Hg and Sb, the total of these elements not to exceed 40%; and from zero to 3% of elements selected form the group consisting of:

As, P, Si, Ge, C, Fe, Ni, Cu, CR, V, Co, Zn, Mo, Nb, and Mn, the total of these elements not to exceed a total of 20%, the slope being larger than 3 mV per 1 per cent change of the lithium content of the anode.

2. An anode according to claim 1, which has versus Li/Li+electro-chemical potentials which vary continuously in the range from about 0.05 V to about 0.8 V, which has a content of aluminum from 20 to 75 weight-%, a content of magnesium from 5 to 50 weight-%, the total percentage of aluminum and magnesium being at least 50 weight-%.

3. An anode according to claim 2, wherein the weight ratio of magnesium to aluminum varies between about 0.25 to 1, and up to 1.5 to 1.0.

4. An anode according to claim 2, comprising from about 5 to 15 weight-% lithium, 15 to 30 weight-% magnesium, and 35 to 70 weight-% aluminum.

5. An anode according to claim 4, of porous structure, being the product of sintering of an alloy powder and a binder.

6. An electrochemical cell comprising an anode according to claim 1.

7. An electrochemical cell according to claim 6, further comprising an electrolyte solution which includes a Li+salt (LiI, $LiClO_4$ or $LiBF_4$), one or more metal salts selected from $Mg^{++}$, $Sr^{++}$, $Ca^{++}$ and $Ba^{++}$ salts, and one or more co-solvents selected from PC, EC, Diglime, THG, 2-Me THF and 1,3 dioxolane.

8. An electrochemical cell according to claim 7 where the electro-lyte contains a lithium salt selected from $LiAsF_6$, $LiBF_4$, LiI, LiBr, $LiCF_3SO_3$, $(LiCF_3SO_3)_2N$, $LiClO_4$ a polymer selected from polyethylene oxide, polymethyl methacrylate, polyvinyl chloride, strene butadiene rubber, polybutadiene, polyethylene, polypropylene, polyacrylonitrile and polychloroprene.

9. An electrochemical cell according to claim 6 where the cathode contains an oxide, chalcogenide or halogenide selected from $CoF_3$, $NiF_2$, $CuCl_2$, AgCl, AgI, $CoS_2$, $TiS_2$, $Co_2O_3$, CuO, $Li_4CoO_2$, $Li_yMnO_2$, $MoS_x$ and $Li_yV\ O_x$, and from combinations of any of these.

10. An electrochemical multi-cell battery comprising a plurality of anodes, claimed in claim 2.

* * * * *